(12) United States Patent
Pristash

(10) Patent No.: US 7,534,514 B2
(45) Date of Patent: May 19, 2009

(54) POLYMER ELECTROLYTE MEMBRANE FUEL CELL STACK

(75) Inventor: David J Pristash, Brecksville, OH (US)

(73) Assignee: Pemery Corp., Brecksville, OH (US)

( * ) Notice: Subject to any disclaimer, the term of this patent is extended or adjusted under 35 U.S.C. 154(b) by 0 days.

(21) Appl. No.: 11/242,239

(22) Filed: Oct. 3, 2005

(65) Prior Publication Data

US 2006/0093883 A1    May 4, 2006

Related U.S. Application Data

(60) Provisional application No. 60/614,476, filed on Oct. 1, 2004.

(51) Int. Cl.
*H01M 8/10* (2006.01)
(52) U.S. Cl. .............................. 429/32; 429/34; 429/39
(58) Field of Classification Search .................. 429/13, 429/34, 39
See application file for complete search history.

(56) References Cited

U.S. PATENT DOCUMENTS

| | | | | |
|---|---|---|---|---|
| 4,586,999 A * | 5/1986 | Goldsmith et al. | .......... | 204/265 |
| 6,242,118 B1 * | 6/2001 | Grasso et al. | .................. | 429/13 |
| 6,312,842 B1 * | 11/2001 | Reiser et al. | .................. | 429/13 |
| 2002/0106551 A1 * | 8/2002 | Speranza et al. | .............. | 429/44 |
| 2003/0096148 A1 * | 5/2003 | Edwards | ...................... | 429/32 |
| 2003/0215686 A1 * | 11/2003 | DeFilippis et al. | ............ | 429/34 |
| 2004/0013919 A1 * | 1/2004 | Ueda et al. | .................... | 429/22 |

OTHER PUBLICATIONS

Fuel Cell Technology Handbook, Gregor Hoogers, editor, CRC Press 2003, title pages and section 4.2, Fuel Cell Performance: the MEA and the Current/Voltage Curve, pp. 4-2 and 4-3.
Fuel Cell Technology Handbook, section 4.2.4, Mass Transport Effects, p. 4-8.
Fuel Cell Technology Handbook, section 4.3.1.2, The Role of Water, p. 4-13.
Fuel Cell Technology Handbook, section 4.4, Other Hardware—The Fuel Cell Stack, pp. 4-18 through 4-20.

* cited by examiner

*Primary Examiner*—Patrick Ryan
*Assistant Examiner*—Ben Lewis
(74) *Attorney, Agent, or Firm*—Schiff Hardin LLP

(57) ABSTRACT

A fuel cell includes a stack of electrolyte membranes joined to one another to form an interior space and an exterior space. Fuel, such as hydrogen, is provided to the interior space. The electrolyte membranes are circular and joined to adjacent membranes at the outer perimeters to enclose the interior space. A stack of such membrane assemblies is provided on a shaft and is rotated within a housing to drive off byproduct water. The water is collected and recirculated by spraying over the fuel cell stack for cooling and hydration.

4 Claims, 4 Drawing Sheets

Figure 3a
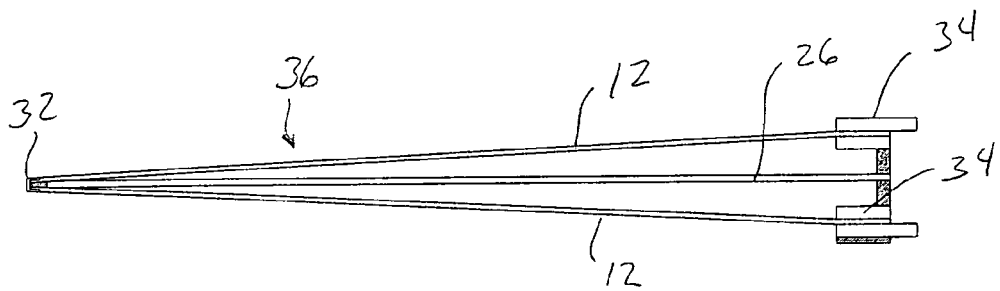
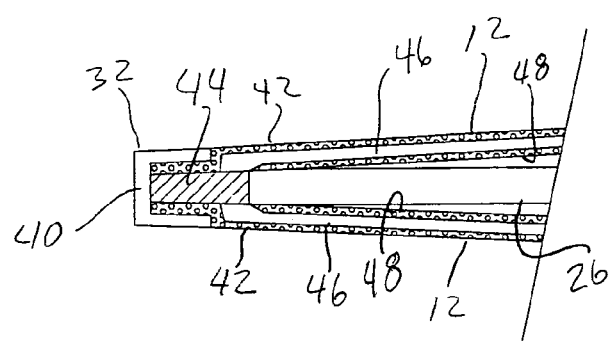
Figure 3b
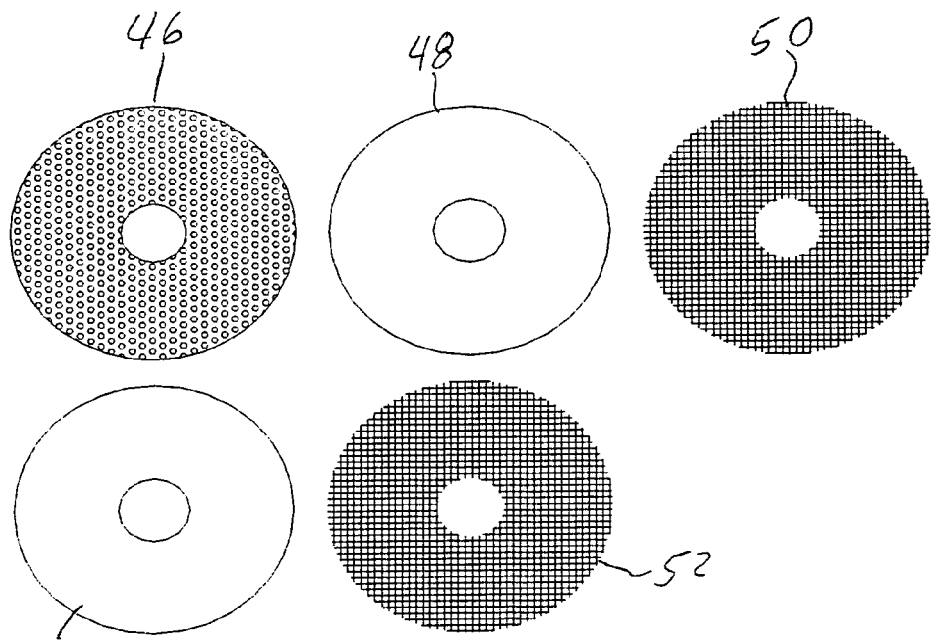
Figure 4

POLYMER ELECTROLYTE MEMBRANE FUEL CELL STACK

CROSS-REFERENCE TO RELATED APPLICATION

This application claims the benefit of U.S. Provisional Patent Application Ser. No. 60/614,476, filed Oct. 1, 2004, which is incorporated herein by reference.

BACKGROUND OF THE INVENTION

1. Field of the Invention

The present invention relates generally to a fuel cell, and more particularly to a fuel cell using a polymer electrolyte membrane.

2. Description of the Related Art

A fuel cell is an electrochemical energy conversion device. Fuel cells use an electrolyte membrane to catalytically react an input fuel, such as hydrogen and oxygen, to product an electrical current. The electrolyte material is sandwiched between two electrodes (an anode and a cathode). The input fuel passes over the anode (and oxygen over the cathode) where the fuel catalytically splits into ions and electrons. The electrons go through an external circuit that serves as an electric load while the ions move through the electrolyte toward the oppositely charged electrode. At the second electrode, the ions combine to create by-products of the energy conversion process, the byproducts being primarily water and heat. There are several types of fuel cells and the type is based on the electrolyte employed, including: a phosphoric acid fuel cell, a molten carbonate fuel cell, a solid oxide fuel cell, and a polymer electrolyte membrane fuel cell, also referred to as a proton exchange membrane fuel cell.

The type of fuel cell that involves a polymer electrolyte membrane is hereinafter referred to as a PEM fuel cell. Work on PEM type fuel cells has produced fuel cells in the size range of only 0.2 millimeters in thickness and capable of running for over 60,000 hours at 80 degrees Celsius. These kinds of PEM fuel cells are capable of producing better than 400 mA (milliamperes) of current per square centimeter, at 0.7 volts, in some applications, and depending on whether air or oxygen is used on the cathode. Stacking of the cells is required to deliver higher voltages.

While progress in this technology area has been excellent and remarkable gains have been made in miniaturization, a major challenge confronting those working in this field is what is termed in the industry as mass transport, or the management of the internal water movement and water byproduct of the fuel cell process. This problem of water byproduct elimination is further complicated by the fact that water is also required as part of the process of operation and for cooling the fuel cells. Cooling is very important in fuel cell operation because as much as one third of the available energy is released as heat in the stack and must be removed. If the water is not removed or is not removed quickly enough, the fuel cell will flood out and stop generating electricity. The steep drop in performance (the drop in voltage) as shown in the chart in FIG. 1 as a change in the output from 0.8 mA cm$^2$ to 1.4 mA cm$^2$ and labeled mass transport is the result of water build up in the fuel cell stack. It would be desirable to at least reduce this loss in power.

Fuel cell expert Gregor Hoogers describes the critical nature of the problem of managing fuel cell water byproduct in the publication Fuel Cell Technology Handbook (CRC Press; ISBN 0-8493-0877-1). In Chapter 4, entitled "Fuel Cell Components and their Impact on Performance" Hoogers describes the water byproduct problem several times, particularly in paragraphs 4.2, 4.2.4, 4.3.1.2 and 4.4.1.1 where the issue and problems relating to water flow are discussed in detail. It is clear that water and its control is a major factor limiting the use of PEM fuel cells especially at high current draws per unit area and, perhaps, in other fuel cell technologies as well.

In applications where a PEM fuel cell is designed to be operational and to supply power for only a finite amount of time (as for example in the case of ordnance applications where the fuel cell is needed for mere minutes at most) the issue of water control may not be critical. But in applications requiring operational periods of substantially longer time periods such in the use of PEM cells in autos and in stationary power generation applications, the accumulation of the water byproduct causes major problems in terms of fuel cell operation, durability and efficiency.

SUMMARY OF THE INVENTION

The present invention provides a fuel cell apparatus and method for addressing power loss from accumulation of byproduct in the fuel cell during operation. That loss can be eliminated by adopting features of the present invention.

Removal of unwanted or excess liquids has been accomplished in other fields through centrifugal force or spinning techniques such as, for example a laboratory centrifuge, a mechanical spin-drying apparatus, or even a hand-cranked separator. For instance, an apparatus or material contained within a confined space, which space also includes a fluid (such as wastewater or juice, for examples) is subjected to a rotational motion whereby the fluid is forced or flung outwardly. The fluid typically collects or accumulates at or near an outer peripheral space from which it is then extracted.

Though well known in other fields, however, this concept has not been applied in the fuel cell stack art. The present method and apparatus provides that a fuel cell stack is subjected to a spinning or other motion such that excess water byproduct is removed by centrifugal force. However, in order to do this, in the preferred embodiment the fuel cell is configured to permit the centrifugal removal of the liquid byproduct. In order to provide an effective fuel cell that could be operational while being subjected to a spinning force so as to remove water requires that existing methods or configurations of fuel cell construction be dismissed or abandoned, and that modified configurations be developed. To address the issue of unwanted water byproduct accumulation in fuel cells, the fuel cell and method according to various embodiments of the present invention embodies one or more of the following modifications: the cathode reaction is occurs on the outside and the anode reaction on the inside, the unit is configured such that it is substantially circular or disk-like, and placed on a rotating shaft, or otherwise supported so as to turn with respect to a central axis, collector grids and internal busses are provided herein to manage the generated current, a support for the spinning structure (for example, a rotor) and a connection to move the gases into the fuel cell and the current out are provided.

In another aspect of the invention, the fuel cell is configured to collect byproduct water from the cell, cool the water and apply the water to the fuel cell unit as a coolant. In one example, the byproduct water is applied to the fuel cell membrane to hydrate the membrane.

In yet a further embodiment, the fuel cell is configured with pairs of the electrolyte membrane elements connected to one another at outer edges.

In yet another aspect of the invention, the fuel cell membranes are hydrated to improve performance.

BRIEF DESCRIPTION OF THE DRAWINGS

FIG. 3a is a close up view of an element of the fuel cell stack of FIG. 2;

FIG. 3b is an enlarged view of a portion of the element shown in FIG. 3a;

FIG. 4 is an exploded plan view of components of the fuel cell stack;

DETAILED DESCRIPTION OF THE PREFERRED EMBODIMENTS

Figure 2:
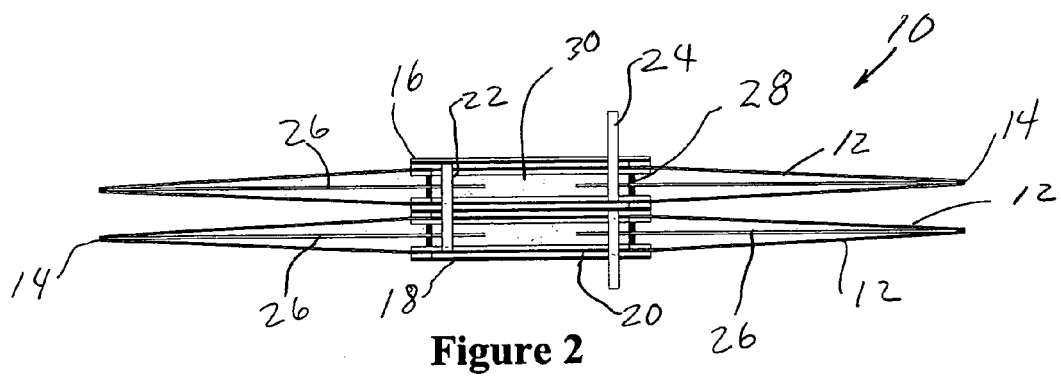
FIG. 2 is a side cross sectional view of a fuel cell membrane stack according to the principles of the present invention.

Referring first to FIG. 2, a fuel cell membrane assembly 10 includes a stack of electrolyte membranes 12, which here are polymer electrolyte membranes, and which have a catalyst thereon, such as platinum. The stacked membranes 12 are provided in pairs with the outer edges of each pair jointed together, at 14. The membranes 12 have a central opening in which is mounted a cylinder shaped assembly 16. The cylindrical assembly 16 includes insulating disks 18 and conducting disks 20, a jumper 22 to connect the membranes to one another, a further jumper 24 that connects the opposite surfaces of the membranes to one another, and supports 26 that extend from the joined edges 14 to a center support cylinder 28. The supports 26 also serve as water and impurity purge tubes. The jumper 24 of the illustrated embodiment is at anode voltage, or 0 volts DC. The electrolyte membranes 12 are configured with the cathode on the outside and the anode on the inside. A porous spacer cylinder 30 is provided.

The stacked membranes 12 of FIG. 2 are constructed and shaped to support and enable the effective spinning of the fuel cell assembly. The membranes provided in a combination referred to as a membrane electrode assembly, or MEA. As indicated above, the cathode, which generates the water, is located on the outside or outer periphery of the structure to be rotated. The centrifugal forces induced in the MEA by spinning the structure act to force the water molecules generated in the cathode generally outwardly of the membrane. The outwardly moving water molecules fly off or are expelled into the containment housing. According to the inventor's current understanding of the invention, there is an optimum balance of the MEA "angle" of the membranes in the assembly and RPM (rotational speed) that the assembly is subjected to that maximizes cell performance. This balance is, of course, dependent upon a number of variables and would be determined by a series of tests. Unlike the typical arrangement of fuel cells, usually configured as to be juxtaposed side-by-side with cathode-to-anode placement one after another, the present invention offers a configuration with the anodes and cathodes defining an interior space and an exterior space, respectively.

The membrane electrode assembly is be configured and constructed such that the current flows to a desired point or location. This means that some disks are insulators, while others are conductors. The bus bars connect these conductors such that there is an overall current flow. In the present inventive apparatus and process, two of these conductive disks are assembled as shown in drawing FIG. 2. This assembly makes up a MEA subassembly that can be stacked to achieve the cumulative power level required by a particular application. In other words, different numbers of the membrane electrode assemblies are connected to one another to produce different power output levels with more stacked assemblies providing higher power and fewer stacked assemblies providing lower power.

FIG. 2 shows many of the features of the present invention; in particular an angle induced in the membranes to allow the water molecules to "spin" off when the device is spun up to operating RPM. Conductive busses are also show where anodes and cathodes are connected in series to make higher voltages. Output amperage is increased by constructing larger diameter subassemblies.

Turning now to FIG. 3a, a single pair of the membranes 12 is shown, or rather one side of the membranes 12. The membranes 12 are connected to one another by an end clip 32 and form a shallow angle relative to one another. The angle may vary from one embodiment to another and may depend on surface properties of the membranes 12 and the rotational speed of the rotation assembly. The support 26 extends between the membranes 12 and in the illustrated embodiment bisects the angle formed by the membranes 12. The support 26 serves as both a supporting structural element for the membranes 12 and as a purge gas suction tube. The membranes 12 are held at the spaced apart edge by support portions 34. Together, these parts for a membrane electrode structure 36, also termed an MEA.

To construct the MEA, once single membranes are constructed or fabricated, they are assembled into a sub-assembly as shown in drawing FIG. 3a. Two membrane disks are put together such that the anodes face each other, while the cathodes face generally outwardly. The membrane discs are joined on the end or periphery thereof with clips and supports that allow for the conduction of current between each membrane anode and cathode, thus making them operate effectively as one membrane.

The support 26 shown in FIG. 3a also serves as a gas/water purge, as discussed in further detail hereinbelow. On the inside (rotor side, or toward the innermost portions thereof) the membranes are assembled with a series of conductive and insulating disks. Only one half of the sub-assembly is shown in drawing FIG. 3a.

The end clip 32 is shown in greater detail in the enlarged view of FIG. 3b. In particular, the end clip includes a conductor 40 that extends over the end of the membranes and a short distance onto the top and bottom surfaces of the membrane electrode structure. An outer surface of each of the membranes 12 includes a conductive cathode coating 42 that extends under the conductor 40. An insulator element 44 is provided between the cathode coatings 42. The insulator element 44 can be a separate element as shown or an extension of the material of the membranes 12. The membranes 12 have an inner membrane material or core 46 of the polymer electrolyte material. This material 46 supports the cathode coating 42 on the outside as well as a conductive anode coating 48 on the inside surface thereof. The anode coatings 48 of the two membranes 12 abut the support 26, which is of a conductive material.

FIG. 4 shows one of the membranes 12 broken down into their layers or components. First, attention is directed to the shape of the membrane layers, which are circular in the illustrated embodiment and include a central hole or opening. The circular membrane 12 facilitates rotation of the fuel cell unit, as discussed in greater detail herein. The circular membranes and their layers that make up the stack may be formed in one circular shaped piece, or may be made up of segments or sections of a circle. For example, it is contemplated to provide membrane layers that are half-circle shaped or quarter-circle shaped, which are then joined together to form the circular membranes. Other arrangements of shapes may be provided for circular membranes or for membranes that are of other shapes, such as polygons and the like. The segments may be two 180 degree segments joined together, four 90 degree segments joined together, or twelve 30 degree segments joined together, for example. This may depend on manufacturing constraints or strength of material considerations. Many other configurations of membranes shapes and sections are possible and within the scope of this invention.

The core layer of the membrane 12 shown in FIG. 4 is a Nafion membrane 46. Nafion is a trade name for a perfluorinated polymer that contains small proportions of sulfonic or carboxylic ionic functional groups. Attached to the Nafion membrane 46 is the anode layer or coating 48. Associated with the anode layer is an anode current collector layer 50. On the opposite side of the Nafion membrane layer 46 is the cathode layer 42 and associated with the cathode layer 42 is a cathode current collector 52. The membrane core may be formed of other materials, including but not limited to polymer electrolyte membrane (PEM) materials. Any material that enables the fuel cell to operate is within the scope of the present invention.

The current collectors 50 and 52 are wire mesh members that are embedded in the cathode and anode not only for current carrying capacity, but also for increased strength during rotation of the membranes and when subject to tension as a result of the supports 26. The wire mesh can be woven, non-woven or otherwise formed. Instead of the wire mesh it is contemplated to use conductive films or layers or other means for carrying the current.

The MEA (membrane electrode assembly) has a substantially circular shape since the operation of the fuel cell by rotating the MEA suggests that the cell should be generally circular as shown in FIG. 4. While the shape of the preferred embodiment is circular, the construction methods for the operational elements of the fuel components are generally consistent with other PEM designs. The cathode and anode are fabricated or formulated as layers screened or jetted onto an ion-exchange substrate fabricated or otherwise constructed of a suitable ionomer membrane. By way of example only, and in no way to be considered as limiting the scope of the present invention, this base may include the perfluorosulfonate ionomer material Nafion (which is available from DuPont Corp.). Collector grids, described in detail herebelow, are also included as part of the MEA assembly. While Nafion is a commonly used material in fuel cells, it certainly is not the only membrane material available and the present fuel cell will work with any membrane material.

Figure 5:
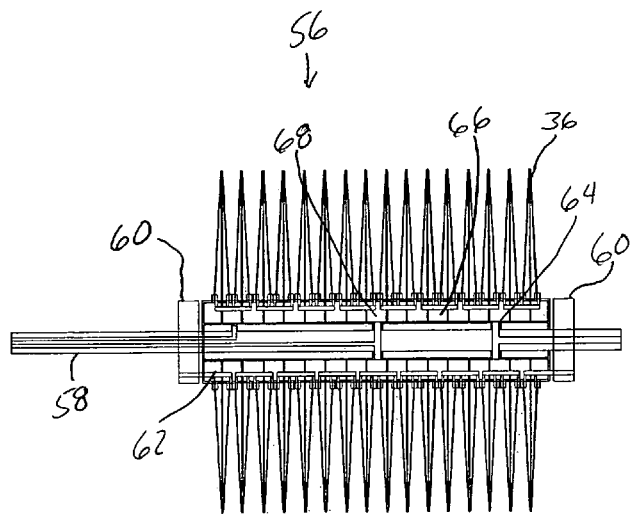
FIG. 5 is a side cross sectional view of the fuel cell stack according to the present invention.

FIG. 5 provides a cross sectional side view of a stack of the membrane electrode assemblies 36 that together make up a fuel cell unit 56 according to one embodiment of the invention. The stack includes, in the illustrated embodiment, 16 membrane pairs or eight of the membrane electrode structures 36. The membrane electrode assemblies 36 are circular in the illustrated embodiment and are provided with a main shaft 58 extending through the central opening of the stacked assemblies. The shaft 58 is hollow and provides passages or tubes through which fuel and, in preferred embodiments, water, are provided. A slip ring 60 is provided on the shaft 58 at both ends of the stack 56 as an electrical connection.

The stack shown in FIG. 5 is one example of a complete rotor and MEA sub-assembly. Key elements shown include: eight MEA subassemblies (in this embodiment), slip rings to collect the electricity, the rotating shaft, a means of porting hydrogen into the anode side, a means of injecting hydration water to the anode, and water and impurity purge sub-system.

A good portion of the illustrated apparatus is made from composites with only the portions conducting current being of metal. As an example only, and in no way considered limiting the scope of the present invention, one example of the rotor assembly is in the range of 10.3 inches in diameter and should be capable of generating well over 10 KW in power in one embodiment and 12.2 KW in another.

Within the interior space of the stack 56 is a gas container 62. A hydrogen gas port 64 leads to a hydrogen chamber 66. Humidifier ports 68 are also provided. As noted with respect to the discussion of FIGS. 2, 3a and 3b, the cathodes are on the outside of the stack and the anodes are on the inside of the stack. In one embodiment, the disk shaped membranes 12 provide 144 square inches of surface area (934 square centimeters) per disk. The 16 disks in the illustrated stack generate 0.75 volts each to provide 12 volts dc for the stack. The surface area of the disks enables the production of 0.9 amps per square centimeter or a total of 840 amps for the stack, or 10 kW.

In another embodiment, the disk shaped membranes are 176 square inches in size (1140 square centimeters). The voltage is 12.2 volts DC as a result of each membrane producing 0.76 volts DC. This results in an output per disk of 1.1 amps, or a total of 1250 amps. As such, a 15 kWatt output is provided.

Figure 6:
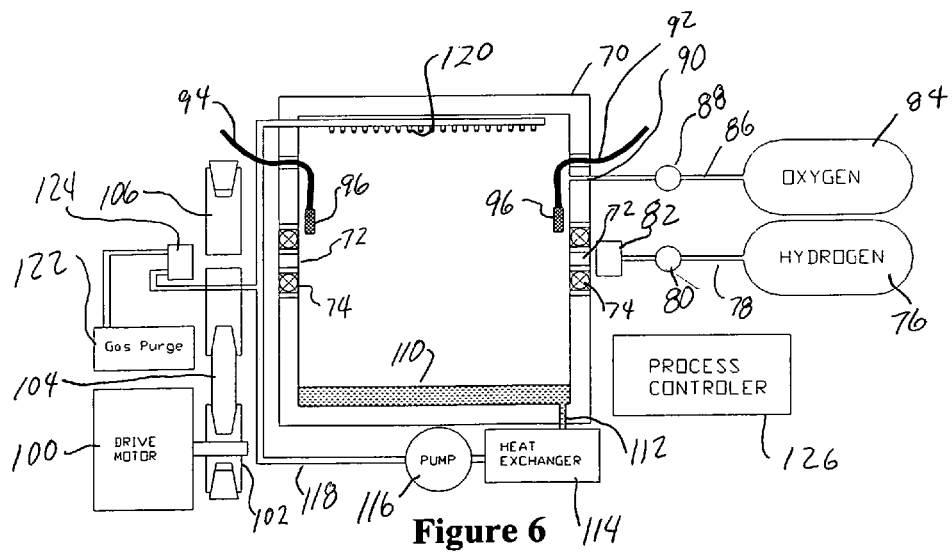
FIG. 6 is a schematic side view of the fuel cell and its supporting systems.

The fuel cell stack of FIG. 5 is provided in a housing and operates with the assistance of associated supplies and supporting apparatus. FIG. 6 shows a housing 70 that encloses the stacked membrane electrode assemblies. The housing 70 has openings 72 through which the shaft 58 extends. Bearings 74 are provided at the openings to facilitate rotation of the shaft 58, and thus the stack 56, in the housing 70. A supply 76 of fuel, which here is hydrogen, is connected through supply lines 78 and a flow regulator 80 to a gas coupling 82. The gas coupling 82 feeds the hydrogen into the hollow shaft 58, such as to one or more passageways or tubes that extend along the interior of the shaft.

The fuel cell stack of the preferred embodiments has the fuel provided to the inside of the fuel cell unit, or stack, 56 and oxygen provided to the outside of the stack. The oxygen can be obtained from the air such as by exposing the outside surface of the stack to the air by air openings in the housing 70, or by supplying oxygen to the outside in a higher concentration than is available in the air. To accomplish this, an oxygen supply 84 is connected through supply lines 86 through a regulator 88 to a port 90 in the housing 70. The housing 70 is sealed to be air tight, or at least substantially air tight, so as to retain the oxygen supply within the housing 70.

As noted above, the stack 56 produces electricity, which is carried from the stack by an anode connection 92 and a cathode connection 94. The anode and cathode connections 92 and 94 are electrical conductors that extend through the housing 70 from contacts 96 which connect to the electrical connections of the stack 56 so as to permit an external load to be connected to the fuel cell. Since the conductors 92 and 94 extend through the housing 70, a seal is preferably provided when the housing is to be air tight to retain the oxygen therein.

The shaft mounted fuel cell stack 56 is rotated in the preferred embodiment. A motor 100 is mounted external to the housing 70 and the output of the motor is provided with a pulley 102, over which is provided a belt 104 that connects to a second pulley 106 on the shaft 58. Operation of the motor 100, thus, spins the shaft 58 and the fuel cell stack 56. The belt may be a V belt, a toothed timing belt, or other type of belt. In place of the belt, gears or idler wheels, or some other linkage may be provided instead to transmit the rotational energy of the motor 100 to the fuel cell stack 56. It is also contemplated to provide a direct drive of the shaft 58 by the motor 100, or even a transmission, such as a variable speed transmission. The motor 100 of a preferred embodiment is a variable speed AC/DC motor. The motor 100 may be a servo motor, so as to control the rotational speed of the stack.

The operation of the fuel cell produces electricity; and some of the electricity produced may be provided to the motor 100 to rotate the fuel cell stack 56. The result is a net power output from the fuel cell even with the motor being driven. The operating fuel cell stack produces water as a byproduct. The water collects on the cathode side of the fuel cell membranes 12, or on the outside of the membrane electrode assemblies 36. Rotation of the fuel cell stack causes the accumulated water to be thrown outward by the centrifugal force of the spinning surface. Water is thereby driven off the membrane surface to ensure that performance of the fuel cell does not decline as a result of the accumulation of the byproduct water on the membranes.

Other types of motion may instead be utilized to remove the water from the membrane surfaces. For instance, vibration, shaking, wobbling, swinging or other movements would cause the water to be driven off the membrane surfaces and are thus within the scope of the present invention. It is also contemplated that a hydrophobic coating or surface treatment may be utilized, either with motion of the fuel cell stack or in place of the motion, so that the water runs off the membrane surfaces.

The water that is thrown off the fuel cell stack 56 by rotation or otherwise driven off or runs of the stack is collected in a sump 110 at the lower portion of the housing 70. The interior of the housing 70 of one embodiment has baffles that direct the water as desired, such as to the sump 110. Water collected in the sump 110 is carried out of a drain 112 to, in the preferred embodiment, a heat exchanger 114. The operation of the fuel cell generates heat and the water will be warmed by the operating heat. The heat exchanger 114 cools the water for use as a fuel cell coolant, as will be noted hereinafter.

A pump 116 is connected to the heat exchanger 114. The pump 116 carries the water from the sump 110, through the heat exchanger 114 and through recirculating tubes 118 to nozzles 120. The nozzles are either spray nozzles or mist nozzles. The nozzles 120 direct sprays of water onto the fuel cell stack 56. The water being sprayed onto the stack 56 is cooler than the water that was collected in the sump 110 as the result of the operation of the heat exchanger 114. The fuel cell is thereby cooled during operation.

It is possible that the heat exchanger may take many different forms, including a simple heat sink, or that the water tubes 118 themselves serve as a heat exchanger. To remove water from the water lines in the fuel cell stack, it is preferred that a gas purge unit 122 be connected in the water line 118, such as through a coupler 124. A process controller 126 is connected to the various components as needed to control the operation of the fuel cell system. For example, the process controller 126, which is preferably a microprocessor and associated electronics and software, may be connected to the drive motor 100, to the gas purge 122, to the water pump 116 and to the regulators 80 and 88. The controller 126 can regulate the flow of hydrogen and oxygen together or separately to control the fuel cell reaction.

Figure 7:
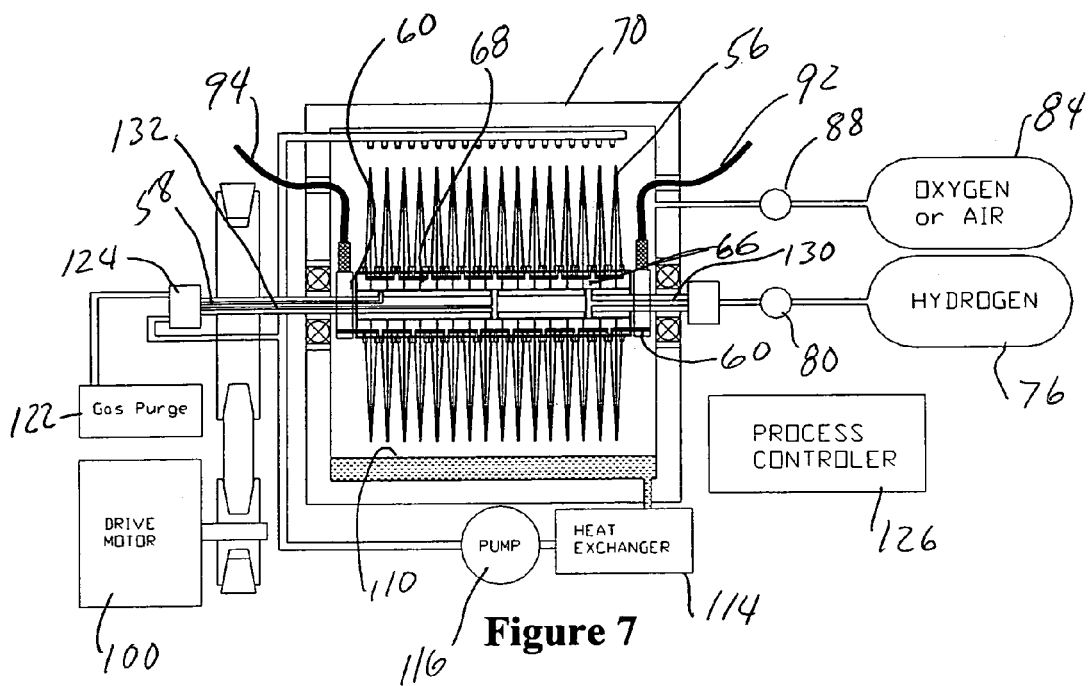
FIG. 7 is a schematic side view of a preferred embodiment of the fuel cell.

The drawings FIGS. 6 and 7 show the housing for the fuel cell rotor and the completed assembly. The housing drawing shows an example of how water generated by fuel cells can be used for cell cooling. As the water spins off the cell it can, for example, be collected in a sump at the bottom of the housing. From there a pump is provided to move the water through a heat exchanger and then to a series of spray nozzles located at the top of the housing.

FIG. 7 shows the assembled fuel cell according to the preferred embodiment, including the fuel cell stack 56 on the shaft 58 and mounted within the housing 70. The electrical connectors 92 and 94 connect to the slip rings 60 to obtain the electrical power from the fuel cell and transmit it to a load (not shown). The hydrogen supply 76 fuels the fuel cell stack 56 by being provided inside the fuel cell stack through the hollow shaft 58 to the hydrogen chamber 66, which is connected to the interior space between the membranes 12 of the membrane electrode assemblies 36. Passageways 130 along the inside of the hollow shaft 58 carry the hydrogen to the desired locations.

The water collected at the sump 110 is pumped to the coupling 124 by the pump 116. The water is carried through the coupling 124 to water conduits 132 within the hollow shaft 58 that carry the water to the humidifier ports 68. The humidifier ports 68 of one embodiment are fluid carrying passageways within the interior of the fuel stack that extend to the spaces between adjacent membrane electrode assemblies to provide the water to the outside surfaces of the membranes 12. This water hydrates the membranes 12 for improved efficiency in the fuel cell.

When delivery of the water is no longer desired to the membranes 12, the gas purge unit 122 is operated to direct a pressurized stream of gas through the water lines 132 and thereby blow the remaining water out of the system.

In the manufacture of a fuel cell according to the invention, FIG. 7 illustrates the final assembly of one embodiment. The present assembly of this PEM fuel cell currently is not much bigger in terms of overall size than a conventional design, but is more efficient at generating power even considering the additional energy required to spin or oscillate the rotor or cell unit. Support and ancillary components (besides a spin/oscillation drive mechanism) may be adapted from existing fuel cell unit designs. The functioning of the fuel cell is controlled by a process controller through use of sensors placed where needed.

It is contemplated that the magnetic fields generated by moving currents in the fuel cell stack may be used to power a drive mechanism for spinning, or to do other work in the system.

Thus, a fuel cell apparatus and method are provided according to the present invention, wherein the fuel cell is, in one embodiment, rotated during operation and is constructed in such as way as to facilitate rotation and to remove water from the fuel cell. A number of principles are embodied in the preferred fuel cell. In particular, according to a first principle, the present fuel cell is designed so that a cathode reaction occurs on the outside and an anode reaction occurs on the inside. This results in a fuel cell system wherein the oxygen, air, or other oxidant gas is on the outside, or toward the outer perimeter of the cell, and the hydrogen or other fuel gas is on the inside.

In a second aspect, the fuel cell is configured to facilitate a spinning action of the fuel cell unit. For example, the fuel cell unit is mounted on a rotating shaft or otherwise supported so as to turn with respect to a central axis. The rotational support itself may be at or near a central point of the unit, at or near the unit's periphery, or wherever spinning movement can be enabled. To further facilitate the spinning of the fuel cell unit, the components of a preferred embodiment are substantially circular or disk-like, although other shapes of cells may be used instead and are within the scope of this invention. For example, a fuel cell having square cells or other polygonal shapes could be spun, but circular designs make better use of the existing space. Depending on other factors, square cells could be rotated and they would work just as well as round cells. It is contemplated and within the scope of this invention that other methods resulting in a spinning action could be employed. It is important however that all design considerations be taken into account such as gas flow and humidification, which also are needed.

As a third aspect, preferred embodiments of the present invention offer a way to collect and distribute the electric current being generated by the cell reconfigured and moveable as described. Collector grids are provided in the fuel cell membranes and internal busses are provided herein to manage the generated current.

Fourthly, embodiments of the present invention present as an example a means to support the spinning structure (e.g., a rotor), and to move the gases into the fuel cell and the current out.

Further, by separating the hydrogen supply and oxygen supply, as is done in the present apparatus, it becomes possible to control gas flow much more precisely. This should allow the cell to be run more efficiently and give much better control of the power density variations that occur in more traditional designs. Traditional designs do not lend themselves to doing this.

Figure 1:
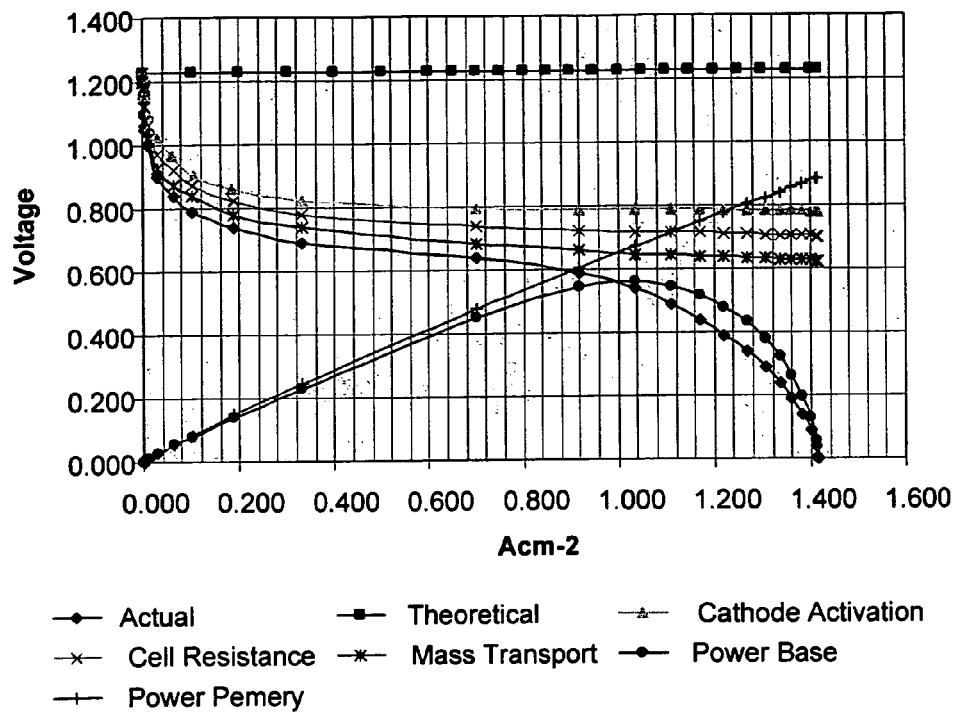
FIG. 1 is a graph showing performance in terms of effects of increased current draw on voltage output for various fuel cell configurations.

The resultant of making these changes is that the fuel cell is able to generate significantly more current while still maintaining a high voltage than in other conventional methods of fuel cell construction. See the graph of FIG. 1 and in particular the data depicting the operation of a fuel cell according to the present invention. For example, applicant submits that a fuel cell stack using the teachings of the present invention would generate 1250 mA per $cm^2$ at 0.75 VDC per cell whereas more traditional methods only generate 400 mA per $cm^2$ at 0.75 VDC. This significant improvement is in the range of 50% to 60% greater than prior fuel cells, which means that for a given power output, the cost of generating the power will be reduced.

The PEM fuel cell normally operates in the general range of 80 degrees C. but in this design, with significantly better cooling capacity, it should be possible to operate the PEM fuel cell at a slightly higher temperature which would thus enhance performance. Also shown in this drawing is the drive motor used to spin the rotor shaft. The motor could be of a conventional or servo type, and need not be particularly large. Once up to speed, only the energy for friction must be overcome. Any small motor (electric, air or any other means) will work here, and small motors are preferred so as to minimize consumption of power generated by the fuel cell.

It should be noted that an oscillating motion of the fuel cell could be applied as an alternative to spinning. Further, the orientation of stack assemblies may be substantially vertically or substantially horizontally aligned, or at any suitable angle therebetween as dictated by preference, environment or use. Any angle will work so long as provision is made to remove water. A design that shakes instead of spins also would suffice, if resultant vibration is adequately dampened. It would eliminate the rotation, which would simplify design in that regards.

Another important element of this design is the gas and water purge system. The gas and water purge system starts in the MEA assembly where the support tube 26 serves also as a suction tube. The tube is connected to a collector cylinder built into the rotor assembly. From there the purged material is pulled out by use of gas differential pressure and suction from the gas purge subassembly shown on the drawing. A rotary coupling is placed on an end of the drive shaft to allow the connection of rotating and non-rotating devices.

Oxygen/air and hydrogen are feed in to the fuel cell through regulators as shown. The oxygen/air enters the housing and the hydrogen is feed into the rotor assembly through another rotary coupling. Power is feed off though insulated cables to the external power conditioning subsystems, and directed to its point of application for doing work. Lastly some of the water is used to hydrate the hydrogen gas. The water for hydration is fed in though one of the rotary couplings to a series of nozzles designed specifically to spray water into the hydrogen chamber.

Not shown in these drawings, as a separate drawing is a key piece of the system: the power collector system. This collector system includes a number of components: the current collector grid as shown as a mesh in FIG. 4; and the current collector rings and insulators and the bus system to move the power to the slip rings all shown collectively in FIG. 2.

The current collector grid embedded in the MEA is a major part of this subsystem. The actual layering of the MEA includes the cathode current collector (wire mesh or other material), the cathode material, Nafion® or other membrane material, the anode material, and then the anode current collector (wire mesh or other material). All these items are show in drawing FIG. 4 as separate items.

The electrons being freed from the hydrogen atoms by the catalyzing reaction of the platinum must be moved, or allowed to flow, with minimum resistance through the system. To achieve this, a fine wire mesh is provided, which may be woven or alternatively formed from a suitable metal and embedded into the cathode and anode layers. The ends of the collector grid would be attached to the conductive rings in the rotor to collect freed electrons and conduct them for application outside the fuel cell. Traditional highly conductive foils and/or other conductive materials could also be used in this design in place of the wire mesh.

In an alternative design a fixed or rotating MEA assembly is added to the outer housing by making it round instead of rectangular. This construction is similar to an electric motor with the outer MEA analogous to the motor's field coils and the inner MEA analogous to the motor's armature. The airflow of the rotor MEA's would pull water off the field MEA's to thus result in a higher power density.

Secondary effect of this latter design is reduction of "hot" and "cold" spots on the MEA. In traditional designs it is difficult to remove the water byproduct, and also difficult to remove the free electrons (because of complications in design for water and gas control) from the MEA. Complications result in "cold" spots where excess water floods the cell and "hot" spots where electrons accumulate awaiting removal. In this design affording good access to the MEA these issues can be eliminated or at lest significantly reduced. Making a MEA that gives uniform performance over its entire surface will improve all aspects of cell performance.

Another effect that has potential for improvement, in this design, is to use the current flows in the MEA to do work. This is not possible in a traditional design because of lack of access to the field being generated in the stack. The uniqueness of this proposed open design would allow for designing in a system to make use of magnetic fields present in the MEA to generate motion.

Basic physics teaches that moving currents generate magnet fields in proportion to the current flowing and the distance traveled. In this design there are, for example 1,250 amps moving through the system with a potential of 12.2 VDC. This will generate a strong field in portions of the rotor assembly. The flow of electrons, current, is from the inside of the MEA (anode) of the rotor through the collector system to the outside, and then back in through the rotor to the outside of the MEA (cathode). This results in the capability to design the system to use the magnetic fields to create motion, for example, to move the rotor as a result of strategically placed permanent magnets, in lieu of utilizing an outside motor. This would improve the overall efficiency of the system and eliminate components.

Other methods of construction are possible such as instead of making the MEA's into rings, as shown here, they would be made into cylinders that would be stacked end to end. This method works the same way as previously described but could be made smaller in the direction perpendicular to the spin while be made longer in the direction parallel to the spin. There are advantages to both methods and which was selected would depend on the application.

Aspects of the presently illustrated embodiment include: spinning or oscillating the fuel cell MEA assembly to remove water; forming the MEA assemblies as a disk that is thicker at the center and thinner at edge; forming the MEA assemblies as a cylinder and stacking them end to end; constructing the MEA so that the cathode is on outside; constructing the MEA so that the anode is on inside; making a membrane having a round shape with a clearance hole in the middle; providing a water/gas purge tube inside the MEA to remove excess material; providing a purge tube part of the MEA support mechanism; splicing two MEAs together to make a disk into one cell by electrically joining at the end; making the disk assembly self-tensioning by use of the purge tube and conductive disks; using conductor and insulator disks in center to properly assembly disk assembly; using bus bars to connect the conductive disks into an electrical power collector system; using a wire mesh embedded in the anode to move electrons out of the MEA; using a wire mesh embedded in the cathode to move electrons into the MEA; providing a spacer cylinder that is porous to hydrogen to give support and flow; providing an MEA rotor assembly that is integral with the hydrogen delivery manifold; providing a rotor assembly with a built in purge chamber; providing a hydrogen deliver though a rotor shaft; using the rotor assembly to deliver the water to control humidity in the hydrogen gas; using the rotor assembly to pull the purged gas/water from the accumulation chamber; using slip rings to move current from the rotor assembly to the fixed housing; using a spray or misting nozzles to spray cooling water over an MEA assembly; using baffles to direct water flow inside the housing; using the water formed in the reaction as cooling water; using the bottom of the rotor housing as a water sump; providing a surge tank to store excess water; using slip couplings to move gas and water into and out of the rotor assembly; using a variable speed AC/DC motor to control speed and direction of rotation/oscillation; using a servomotor to control rotor speed; controlling the fuel cell reaction by regulating the oxygen and hydrogen pressure together or separately; and use of magnetic fields generated by moving currents in MEA to do work in system such as power the drive mechanism to do the spinning.

In the exemplary embodiments, the output of the system may be 10 KW or 15 KW. In the 10 KW system the area of each disks is 144 sq. in. for a total of 934 sq cm for the stack and an output per disk of 0.75 VDC or 12 VDC for the fuel cell stack. The current available is 0.9 amps per disk or 940 amps for the unit. In a 15 KW system, the area of each disk is increased to 176 sq. in. for a stack total of 1,140 sq. cm. Output voltage for the stack is 12.2 VDC as a result of 0.76 VDC per disk. The system output is 1,250 amps, or 1.1 amps per disk.

Although other modifications and changes may be suggested by those skilled in the art, it is the intention of the inventors to embody within the patent warranted hereon all changes and modifications as reasonably and properly come within the scope of their contribution to the art.

I claim:

1. A fuel cell for converting a fuel gas and an oxidant gas to electrical power, comprising:
   a fuel cell membrane assembly including a support structure and a plurality of fuel cell membrane portions mounted on said support structure to define an interior space, said fuel cell membrane portions each comprise a pair of disk shaped membranes mounted spaced from one another at a central portion and angled toward one another at a perimeter thereof,
   an edge clip joining the perimeters of said pairs of said disk shaped membranes to one another,
   a plurality of elongated support members extending substantially radially inward from said edge clip to between said pairs of said membranes;
   a connection to feed the fuel gas to said interior space;
   a housing in which said fuel cell membrane assembly is mounted; and
   a drive connected to move said fuel cell membrane assembly so as to drive off byproduct water produced during operation of said fuel cell.

2. A fuel cell as claimed in claim 1, wherein said housing includes a water collection sump.

3. A fuel cell as claimed in claim 1, further comprising:
   a water recirculating system connected to said sump, said water recirculating system connected to supply water collected in said sump to said fuel cell membrane assembly.

4. A fuel cell as claimed in claim 1, further comprising:
   a purge apparatus connected to said water recirculating system.

* * * * *